US012299202B2

(12) United States Patent
Kim et al.

(10) Patent No.: US 12,299,202 B2
(45) Date of Patent: *May 13, 2025

(54) APPARATUS AND METHOD FOR PROVIDING HAPTIC CONTROL SIGNAL

(71) Applicant: CK MATERIALS LAB CO., LTD., Seoul (KR)

(72) Inventors: Hyeong Jun Kim, Seoul (KR); Ki Suk Son, Seoul (KR); Jong Hun Lee, Seoul (KR)

(73) Assignee: CK MATERIALS LAB CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/509,484

(22) Filed: Nov. 15, 2023

(65) Prior Publication Data

US 2024/0085984 A1   Mar. 14, 2024

Related U.S. Application Data

(63) Continuation of application No. 16/614,491, filed as application No. PCT/KR2017/012850 on Nov. 14, 2017, now Pat. No. 11,847,262.

(30) Foreign Application Priority Data

Nov. 13, 2017   (KR) .................. 10-2017-0150314

(51) Int. Cl.
G06F 3/01   (2006.01)
G06F 3/16   (2006.01)
G08B 6/00   (2006.01)

(52) U.S. Cl.
CPC ............. G06F 3/016 (2013.01); G06F 3/16 (2013.01); G08B 6/00 (2013.01)

(58) Field of Classification Search
CPC ............. G06F 3/016; G06F 3/16; G08B 6/00
See application file for complete search history.

(56) References Cited

U.S. PATENT DOCUMENTS

| 4,779,615 | A  | 10/1988 | Frazier |
| 5,951,500 | A  | 9/1999  | Cutler |
| 6,027,463 | A  | 2/2000  | Moriyasu et al. |
| 7,189,211 | B2 | 3/2007  | Inada et al. |
| 7,378,589 | B2 | 5/2008  | Kameda |
| 8,306,500 | B2 | 11/2012 | Tho et al. |

(Continued)

FOREIGN PATENT DOCUMENTS

| JP | 2011167570 A | 9/2011 |
| KR | 09174302     | 1/1999 |

(Continued)

*Primary Examiner* — Nay Tun
(74) *Attorney, Agent, or Firm* — NKL Law; Jae Youn Kim

(57) ABSTRACT

An apparatus and a method for providing a haptic control signal of a haptic device are disclosed. The apparatus for providing a haptic control signal of a haptic device comprises: a haptic pattern data determination unit for determining haptic pattern data on the basis of at least one of an audio signal and an additional effect signal; a haptic control signal generation unit for generating a haptic control signal for controlling a vibration operation of the haptic device on the basis of the haptic pattern data; and a transmission unit for transmitting the haptic control signal to the haptic device.

19 Claims, 14 Drawing Sheets

(56) References Cited

U.S. PATENT DOCUMENTS

| | | |
|---|---|---|
| 8,369,887 B2 | 2/2013 | Choe et al. |
| 8,436,241 B2 | 5/2013 | Yamashita et al. |
| 8,653,352 B2 | 2/2014 | Wauke |
| 8,754,757 B1 * | 6/2014 | Ullrich .................. G08B 6/00 340/407.1 |
| 9,368,005 B2 | 6/2016 | Cruz-Hernandez et al. |
| 9,891,714 B2 | 2/2018 | Ullrich et al. |
| 9,898,085 B2 | 2/2018 | Saboune et al. |
| 10,229,565 B2 | 3/2019 | Cha et al. |
| 10,264,551 B2 | 4/2019 | Borras et al. |
| 10,609,541 B1 * | 3/2020 | Govindassamy . H04M 1/72418 |
| 10,860,204 B2 | 12/2020 | Kim et al. |
| 11,046,225 B2 | 6/2021 | Mergl et al. |
| 2003/0104824 A1 | 6/2003 | Hale et al. |
| 2004/0097851 A1 | 5/2004 | Inada et al. |
| 2006/0130637 A1 * | 6/2006 | Crebouw ............ G10L 19/0204 84/603 |
| 2008/0228212 A1 | 9/2008 | List |
| 2010/0130296 A1 * | 5/2010 | Ackley .................. A63G 7/00 472/61 |
| 2010/0137066 A1 * | 6/2010 | Cheng .................. A63F 13/57 463/37 |
| 2010/0148942 A1 | 6/2010 | Oh et al. |
| 2011/0001707 A1 * | 1/2011 | Faubert .................. G06F 3/016 345/173 |
| 2011/0068657 A1 | 3/2011 | Sunaga |
| 2011/0157052 A1 | 6/2011 | Lee et al. |
| 2012/0112894 A1 | 5/2012 | Yang et al. |
| 2012/0306631 A1 | 12/2012 | Hughes |
| 2013/0163785 A1 | 6/2013 | Lee et al. |
| 2013/0262634 A1 | 10/2013 | Chang et al. |
| 2013/0307786 A1 | 11/2013 | Heubel |
| 2014/0015652 A1 | 1/2014 | Han et al. |
| 2014/0035736 A1 * | 2/2014 | Weddle .................. G05D 1/005 340/407.2 |
| 2014/0064516 A1 | 3/2014 | Cruz-Hernandez et al. |
| 2015/0070152 A1 * | 3/2015 | Rank ................ H04N 21/23614 340/407.1 |
| 2015/0123774 A1 | 5/2015 | Ioffreda et al. |
| 2015/0293592 A1 * | 10/2015 | Cheong .................. G06F 1/163 345/173 |
| 2016/0027264 A1 | 1/2016 | Choi et al. |
| 2016/0049576 A1 | 2/2016 | Levatich |
| 2016/0049915 A1 | 2/2016 | Wang et al. |
| 2016/0329836 A1 | 11/2016 | Sumioka |
| 2017/0348184 A1 | 12/2017 | Pisharodi et al. |
| 2018/0151036 A1 | 5/2018 | Cha et al. |

FOREIGN PATENT DOCUMENTS

| | | |
|---|---|---|
| KR | 1020070012193 | 1/2007 |
| KR | 1020100069736 A | 6/2010 |
| KR | 10-2011-0021480 A | 3/2011 |
| KR | 01020110074333 A | 6/2011 |
| KR | 101203363 | 8/2011 |
| KR | 20110109363 A | 10/2011 |
| KR | 10-2012-0060763 A | 6/2012 |
| KR | 101206351 | 6/2012 |
| KR | 11020140009710 A | 1/2014 |
| KR | 101603957 | 8/2014 |
| KR | 101461274 | 11/2014 |
| KR | 1020130097253 | 2/2015 |
| KR | 101554289 | 9/2015 |
| KR | 101641418 B1 | 2/2016 |
| KR | 101971520 | 2/2016 |
| KR | 1020160106239 | 9/2016 |
| KR | 10-2017-0059485 A | 5/2017 |
| KR | 20170120473 A | 10/2017 |
| KR | 20180062174 A | 6/2018 |
| WO | 2012167316 | 12/2012 |

* cited by examiner

APPARATUS AND METHOD FOR PROVIDING HAPTIC CONTROL SIGNAL

CROSS-REFERENCE TO RELATED APPLICATIONS

This application is a Continuation of U.S. Ser. No. 16/614,49, filed on Jan. 27, 2020, which claims priority of National Stage of International Patent Application PCT/KR2017/012850, filed on Nov. 14, 2017, which claims priority of Korean Patent Application No. KR10-2017-0150314, filed on Nov. 13, 2017, the disclosures of which are incorporated by reference in their entirety.

BACKGROUND/SUMMARY

Technical Field

The following description relates to a method and apparatus for providing a haptic control signal.

Background Art

As the cultural industry develops, types of content entertaining consumers such as a concert and a video game are diversified. Consumer demand for a method of providing visually immersive content such as a virtual reality (VR) and a three-dimensional (3D) image is increasing. In addition, consumer demand for a more tactile and realistic experience is also increasing. Based upon such a trend, interest in a haptic device that provides a haptic feedback to a consumer is gradually increasing. The haptic device may adjust a haptic stimulus to be provided by the haptic device by adjusting an amount of current flowing in the haptic device and a magnitude of voltage applied to the haptic device. In order to provide a higher level of immersion for content provided with the haptic device, it is required to develop technology for delivering various tactile sensations such as rubbing, tightening, hitting, pressing, and beating.

DISCLOSURE OF INVENTION

Technical Solutions

According to an aspect, there is provided an apparatus for providing a haptic control signal, the apparatus including a haptic pattern data determiner configured to determine haptic pattern data based on at least one of an audio signal and an additional effect signal, a haptic control signal generator configured to generate a haptic control signal for controlling a vibration operation of a haptic device based on the haptic pattern data, and a transmitter configured to transmit the haptic control signal to the haptic device.

The haptic pattern data determiner may be configured to extract an audio bit pattern from the audio signal and determine the haptic pattern data based on the extracted audio bit pattern.

The haptic pattern data determiner may be configured to divide the audio signal based on a frequency band, select a signal of at least one frequency band including desired bit pattern information from signals into which the audio signal is divided based on the frequency band, and extract the audio bit pattern by performing half-wave rectification on the selected signal of the at least one frequency band.

The haptic control signal generator may be configured to determine at least one of a signal amplitude characteristic, a signal direction characteristic, and a signal state characteristic of the haptic control signal based on the haptic pattern data.

The haptic pattern data determiner may be configured to extract haptic pattern data corresponding to the additional effect signal from haptic pattern data stored in a database in advance.

The apparatus may further include a visualization data generator configured to generate visualization data corresponding to the haptic pattern data. The transmitter may be configured to transmit the visualization data to the haptic device.

According to another aspect, there is also provided a haptic device including a receiver configured to receive a haptic control signal from a haptic control signal providing apparatus, a haptic pattern data extractor configured to extract haptic pattern data from the received haptic control signal, an actuator configured to generate a vibration, and an actuator controller configured to generate an actuator control signal for controlling an operation of the actuator based on the extracted haptic pattern data.

The haptic pattern data extractor may be configured to restore the haptic pattern data based on at least one of a signal amplitude characteristic, a signal direction characteristic, and a signal state characteristic of the haptic control signal.

The receiver may be further configured to receive visualization data corresponding to the haptic pattern data from the haptic control signal providing apparatus. The haptic device may further include a visualization data display configured to display characteristic information of the haptic pattern data based on the received visualization data.

The haptic pattern data may be generated by the haptic control signal providing apparatus based on at least one of audio data and additional effect data.

According to another aspect, there is also provided a method of providing a haptic control signal, the method including determining haptic pattern data based on at least one of an audio signal and an additional effect signal, generating a haptic control signal for controlling a vibration operation of a haptic device based on the haptic pattern data, and transmitting the haptic control signal to the haptic device.

The determining of the haptic pattern data may include extracting an audio bit pattern from the audio signal and determining the haptic pattern data based on the extracted audio bit pattern.

The determining of the haptic pattern data may include extracting haptic pattern data corresponding to the additional effect signal from haptic pattern data stored in a database in advance.

The generating of the haptic control signal may include determining at least one of a signal amplitude characteristic, a signal direction characteristic, and a signal state characteristic of the haptic control signal based on the haptic pattern data.

According to another aspect, there is also provided an actuator control method performed in a haptic device, the method including receiving a haptic control signal from a haptic control signal providing apparatus, extracting haptic pattern data from the received haptic control signal, generating an actuator control signal for controlling an operation of an actuator based on the extracted haptic pattern data, and controlling the operation of the actuator.

According to another aspect, there is also provided a haptic device including an actuator controller configured to generate an actuator control signal for controlling an operation of an actuator based on haptic pattern data, and an actuator configured to generate a haptic stimulus based on the generated actuator control signal.

The actuator controller may include a direct current (DC) to DC (DC-DC) converter configured to apply DC power to a circuit and a control circuit configured to generate a control signal based on haptic pattern data. The actuator may be configured to generate the haptic stimulus based on the control signal.

The actuator controller may further include an adjuster configured to adjust an intensity of the generated control signal.

Description

BEST MODE FOR CARRYING OUT THE INVENTION

Figure 1:
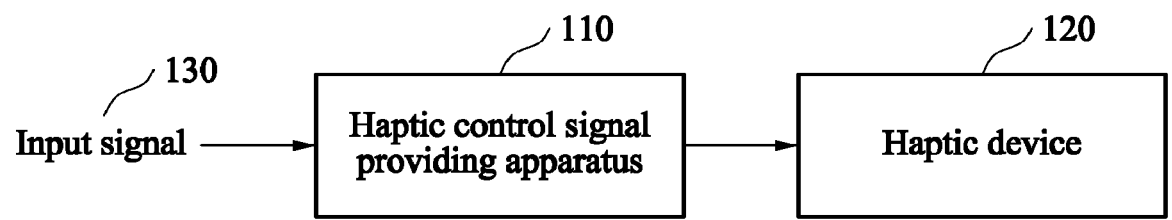
FIG. 1 is a diagram illustrating a haptic stimulus providing system according to an example embodiment.

Reference will now be made in detail to embodiments of the present disclosure, examples of which are illustrated in the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When an embodiment is otherwise implemented, a function or operation specified in a specific block may be performed differently from the flowchart. For example, two consecutive blocks may actually be executed substantially simultaneously, or the blocks may be reversed according to related functions or operations.

Hereinafter, example embodiments will be described in detail with reference to the accompanying drawings. Regarding the reference numerals assigned to the elements in the drawings, it should be noted that the same elements will be designated by the same reference numerals. Also, in the description of example embodiments, detailed description of well-known related structures or functions will be omitted.

FIG. 1 is a diagram illustrating a haptic stimulus providing system according to an example embodiment.

Referring to FIG. 1, a haptic stimulus providing system may include a haptic device 120 that delivers a haptic stimulus to a user and a haptic control signal providing apparatus 110 that provides a haptic control signal to the haptic device 120. The haptic stimulus providing system may perform an operation of the haptic device 120 of the user through the haptic control signal providing apparatus 110, thereby providing various types of haptic stimuli corresponding to a bit pattern such as an audio bit pattern and the like of an external input signal to the user. The haptic stimulus providing system may provide various haptic stimuli to the user of the haptic device 120, thereby providing a higher level of immersion for content to the user.

The haptic device 120 may be a device for providing a haptic stimulus to the user through a vibration. For example, the haptic device 120 may adjust a vibration intensity, a vibration direction, and a vibration cycle to provide various haptic stimuli (e.g., rubbing touch, tightening touch, pressed touch, etc.) to the user. The haptic device 120 may correspond to various types of devices based on an environment in which the haptic device 120 is used. For example, the haptic device 120 may be a video game console in an environment in which the user plays a video game. When the user participates in a concert of a singer, the haptic device 120 may be a cheering tool having a function to provide a vibration based on a bit pattern of music. Also, the haptic device 120 may include any wearable device including, for example, a wearable watch and a wearable band controlled in conjunction with a smartphone.

The haptic control signal providing apparatus 110 may generate a haptic control signal for controlling a haptic stimulus provided by the haptic device 120 and transmit the generated haptic control signal to the haptic device 120. The haptic control signal providing apparatus 110 may receive an input signal 130 and generate a haptic control signal based on the received input signal 130. For example, when the input signal 130 is an audio signal, the haptic control signal providing apparatus 110 may generate a haptic control signal corresponding to an audio bit pattern of the audio signal. When the input signal 130 is an additional effect signal representing a predetermined special effect, the haptic control signal providing apparatus 110 may generate a haptic control signal corresponding to the special effect. For example, when the special effect corresponds to a rain falling situation, the haptic control signal providing apparatus 110 may generate a haptic control signal for controlling the haptic device 120 to generate a haptic stimulus such that the user feels a rain falling touch through the haptic device 120.

Figure 2:
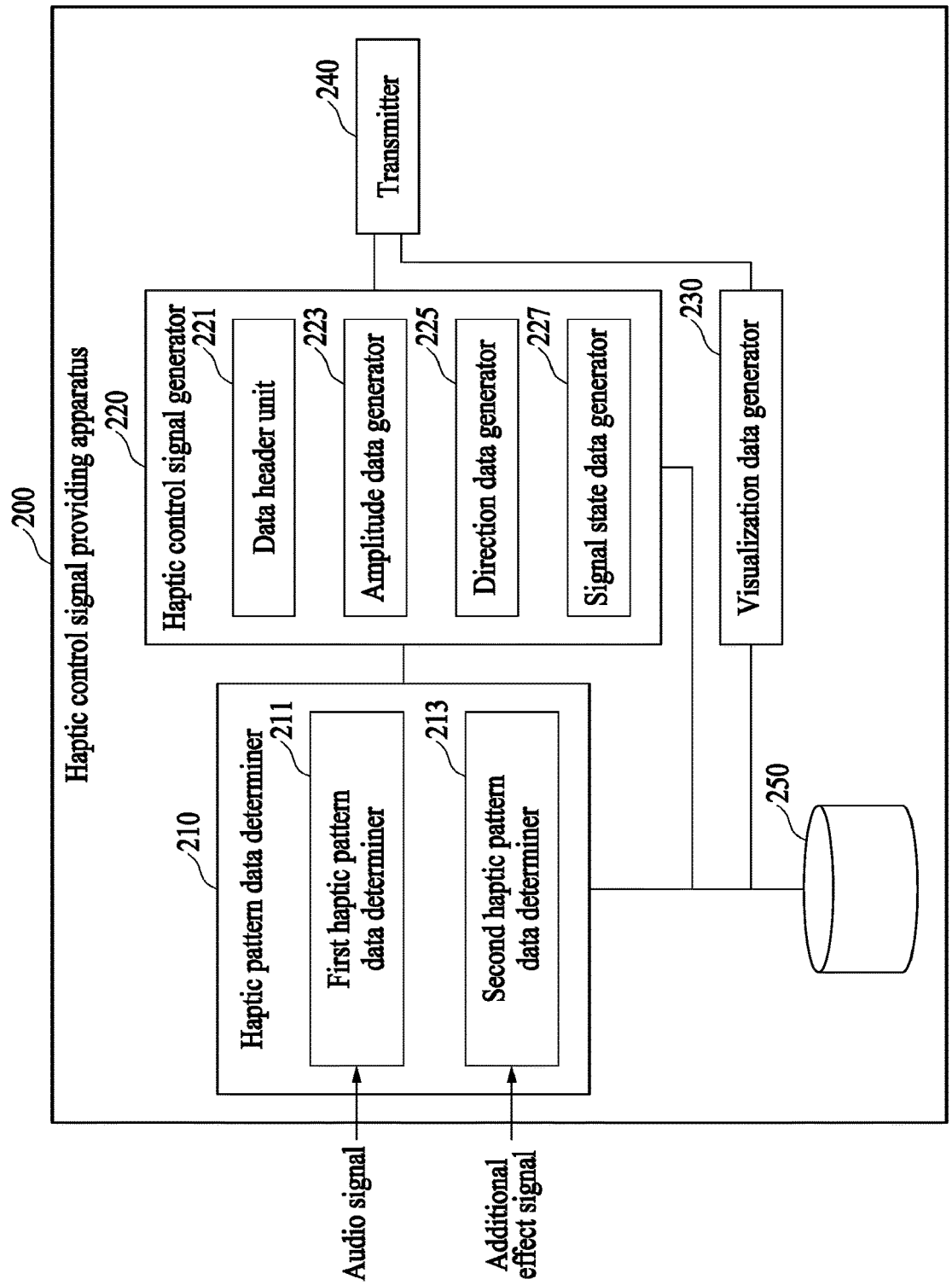
FIG. 2 is a diagram illustrating a configuration of a haptic control signal providing apparatus according to an example embodiment.

FIG. 2 is a diagram illustrating a configuration of a haptic control signal providing apparatus according to an example embodiment.

Referring to FIG. 2, a haptic control signal providing apparatus 200 may include a haptic pattern data determiner 210 that determines haptic pattern data, a haptic control signal generator 220 that generates a haptic control signal based on the determined haptic pattern data, a visualization data generator 230 that generates visualization data corresponding to the haptic pattern data, a transmitter 240 that transmits the generated haptic control signal to a haptic device, and a database 250.

The haptic pattern data determiner 210 may determine haptic pattern data based on at least one of an audio signal and an additional effect signal. The haptic pattern data determiner 210 may include a first haptic pattern data determiner 211 that determines haptic pattern data based on an audio signal and a second haptic pattern data determiner 213 that determines haptic pattern data based on an additional effect signal.

The first haptic pattern data determiner 211 may extract an audio bit pattern from a received audio signal and determine haptic pattern data based on the extracted audio bit pattern. A process of determining haptic pattern data from an audio signal will be described in detail with reference to FIGS. 3A, 3B, 4A, and 4B.

The second haptic pattern data determiner 213 may determine haptic pattern data based on a received additional effect signal. The additional effect signal may be a signal representing a predetermined special effect. The haptic pattern data corresponding to the additional effect signal may be previously generated and stored in the database 250. The predetermined special effect may be, for example, a raining effect, a gun-shot effect, and the like based on provided content. Haptic pattern data for delivering a tactile feeling corresponding to each special effect may be previously generated and stored in the database 250. However, the scope of the special effect is not limited to the example. The second haptic pattern data determiner 213 may identify the received additional effect signal, extract haptic pattern data stored in the database 250 based on the identified additional effect signal, and determine haptic pattern data based on the extracted haptic pattern data.

The haptic control signal generator 220 may include a data header unit 221 that generates a data header including additional information to be included in a haptic control signal, an amplitude data generator 223 that generates amplitude data of the haptic control signal, a direction data generator 225 that generates vibrating direction data of the haptic control signal, and a signal state data generator 227 that generates data associated with a signal state of the haptic control signal.

The data header unit 221 may generate additional information to be included in the haptic control signal. The additional information generated by the data header unit 221 may include, for example, information on a format of the haptic control signal and information on a capacity of the haptic control signal. The amplitude data generator 223 may generate amplitude data of the haptic control signal based on amplitude information of haptic pattern data. The amplitude data of the haptic control signal may be used for determining a vibration intensity of the haptic device, thereby determining a characteristic of a haptic stimulus. The direction data generator 225 may generate vibrating direction data of the haptic control signal based on vibrating direction information of the haptic pattern data. The direction data of the haptic control signal may be used for determining a vibrating direction of the haptic device, thereby determining a characteristic of the haptic stimulus. The vibrating direction may be any direction, for example, a horizontal direction and a vertical direction. The signal state data generator 227 may generate data associated with a signal state of the haptic control signal based on the haptic pattern data. For example, the data associated with the signal state may include data on a time in which a signal is maintained at a maximum amplitude or data on a time in which a signal is maintained in an idle state (e.g., a state in which an amplitude is maintained as zero). The data on a time in which a signal is maintained at a maximum amplitude or the data on a time in which a signal is maintained in an idle state may be used for determining various types of haptic stimulus pattern of the haptic device.

In another example embodiment, the haptic control signal generator 220 may generate a haptic control signal based on haptic pattern data previously generated based on at least one of an audio signal and an additional effect signal and stored in the database 250. The haptic control signal generator 220 may generate a haptic control signal based on haptic pattern data determined based on an audio signal received in real time. Also, the haptic control signal generator 220 may generate a haptic control signal based on pre-generated haptic pattern data stored in the database 220.

The visualization data generator 230 may generate visualization data corresponding to the haptic pattern data. The visualization data may include, for example, data on an emoticon to be added to a screen and data on a character matching with a haptic stimulus pattern for displaying characteristic information (e.g., amplitude data, vibrating direction data, etc.) associated with the haptic pattern data. The visualization data may include, for example, information on a display interface including information on a scheme for providing characteristic information, font information, and color information of a character for displaying the characteristic information of the haptic stimulus pattern. Also, when the haptic stimulus corresponds to an additional effect (e.g., raining effect), the visualization data may include emoticon data (e.g., raindrop emoticon, umbrella emoticon, etc.) and image data (e.g., raining background image, etc.) corresponding to the additional effect. In another example embodiment, the visualization data may include data for providing characteristic information (for example, amplitude information, vibrating direction information, etc.) of haptic pattern data in braille to a visually impaired user and data for providing information on the haptic pattern data in a light emitting diode (LED) pattern.

The transmitter 240 may transmit at least one of the haptic control signal generated in the haptic control signal generator 220 and the visualization data generated in the visualization data generator 230 to the haptic device. The transmitter 240 may transmit the haptic control signal or the visualization data to the haptic device through wired or wireless communication including, for example, Ethernet, Bluetooth, ZigBee, Wireless Fidelity (Wi-Fi), long-term evolution (LTE).

Figure 3A:
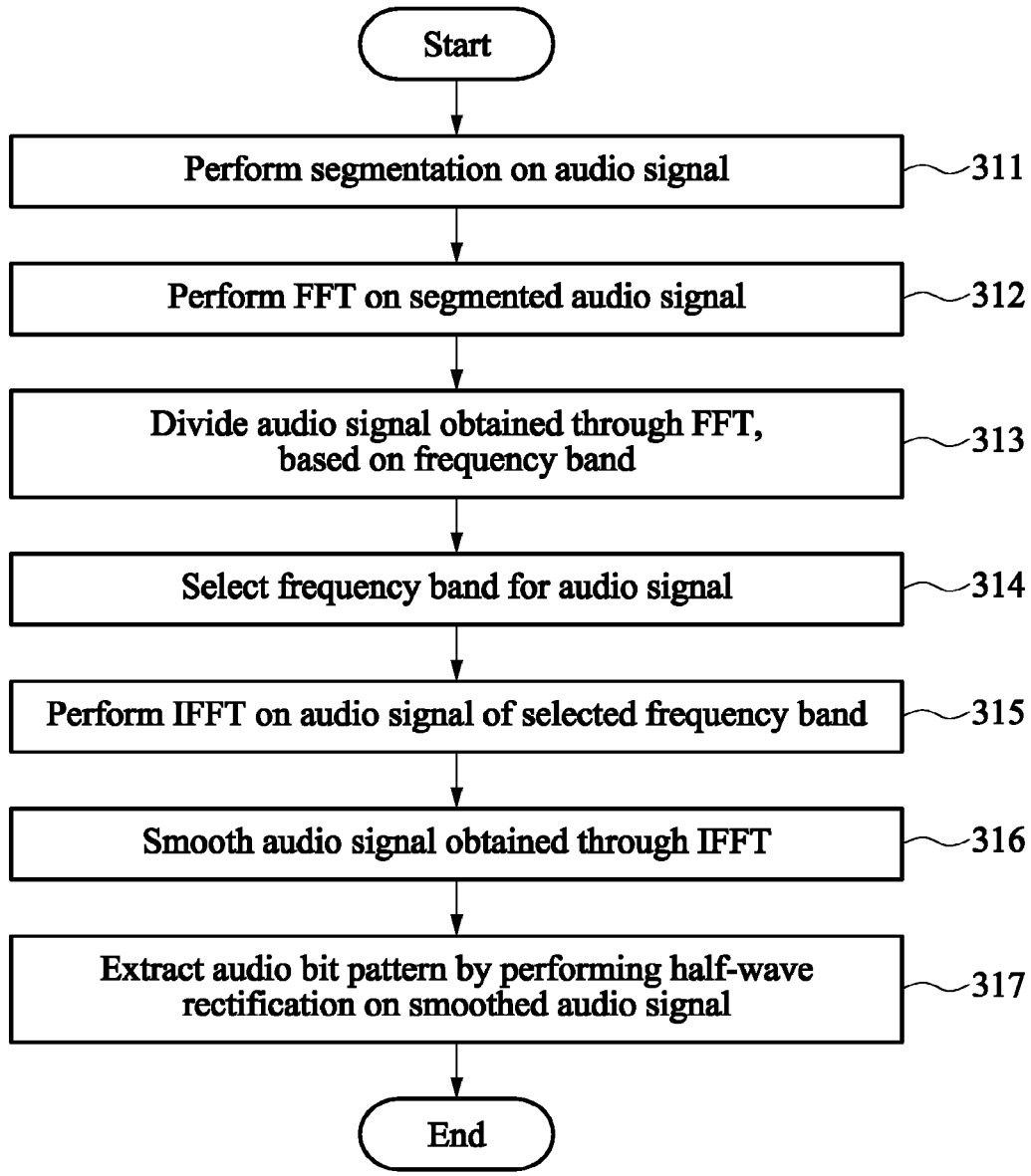
FIG. 3A is a flowchart illustrating a method of extracting, by a first haptic pattern data determiner, an audio bit pattern from an audio signal using a fast Fourier transform (FFT) according to an example embodiment.

FIG. 3A is a flowchart illustrating a method of extracting, by a first haptic pattern data determiner, an audio bit pattern from an audio signal using a fast Fourier transform (FFT) according to an example embodiment.

In an example embodiment, in operation 311, a first haptic pattern data determiner may perform segmentation on an input audio signal to perform the FFT on the audio signal. The segmentation may refer to dividing an audio signal into any number of data streams. For example, the haptic pattern data generator may segment an audio signal into 256 or 1024 data streams to smoothly perform the FFT on the audio signal. The number of data streams obtained through the segmentation is not limited to the example. The first haptic pattern data determiner may segment an audio signal into any number of data streams. For example, the first haptic pattern data determiner may segment an audio signal into 256 or 1024 data streams to smoothly perform the FFT on the audio signal. The number of data streams obtained through the segmentation is not limited to the example.

In operation 312, the first haptic pattern data determiner may perform the FFT on the segmented audio signal to convert the audio signal from a time domain into a frequency domain. In operation 313, the first haptic pattern data determiner may divide the audio signal converted into the frequency domain based on a frequency band. The first haptic pattern data determiner may divide the audio signal converted into the frequency domain, into audio signals of a plurality of frequency bands to acquire an audio signal of a frequency band including a desired audio bit pattern.

In operation 314, the first haptic pattern data determiner may select a signal of at least one frequency band including desired bit pattern information from the audio signals of the plurality of frequency bands. For example, the first haptic pattern data determiner may select a signal of at least one frequency band including bit pattern information to be extracted such as bit pattern information associated with a noise-free audio signal, bit pattern information associated with a specific musical instrument of an audio signal, and the like. For example, when an audio signal corresponding to noise is included in a high frequency band, a signal other than the high frequency band may be selected. Also, when an audio signal of a specific musical instrument is to be extracted from an audio signal including audio signals of various musical instruments, an audio signal corresponding to a frequency band of the specific musical instrument may be extracted selectively. In some example embodiments, when a plurality of frequency bands are required, audio signals of the required frequency bands may be extracted. A scheme for separating an audio signal into a plurality of frequency bands and selecting an audio signal is not limited to the foregoing example. An audio signal may be determined based on a required frequency band in various ways.

In operation 315, the first haptic pattern data determiner may perform an inverse fast Fourier transformation (IFFT) on the selected audio signal. The first haptic pattern data determiner may convert the selected audio signal from the frequency domain into a time domain through the IFFT.

In operation 316, the first haptic pattern data determiner may smooth the audio signal obtained through the IFFT. For example, in a process of smoothing the audio signal, the first haptic pattern data determiner may perform full-wave rectification on the audio signal converted into the time domain through the IFFT, reduce a distortion occurring due to the FFT and segmentation performed on the audio signal, and perform a convolution operation on the audio signal using a window function to smoothly correct a radically changing area. The window function may be, for example, a Hanning function, a Hamming function, and a Kaiser function, but is not limited thereto. Also, when the convolution operation is performed in the frequency domain, a speed of the convolution operation may be increased since a convolution operation in the time domain is the same as a multiplication operation in the frequency domain.

In operation 317, the first haptic pattern data determiner may extract an audio bit pattern by performing half-wave rectification on the smoothed audio signal.

Figure 3B:
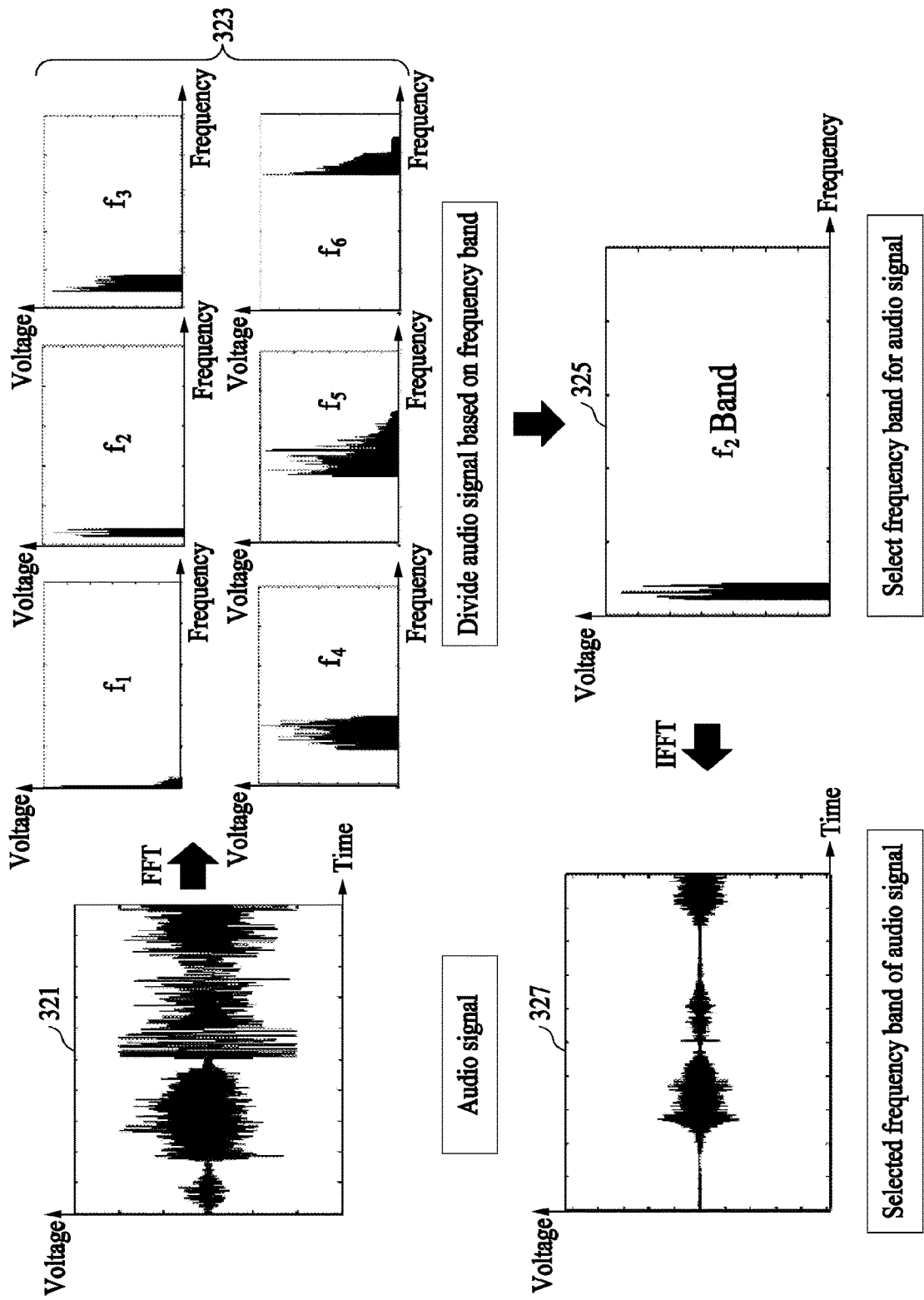
FIG. 3B is a diagram illustrating an example of a first haptic pattern data determiner separating an audio signal of a frequency band including desired bit pattern information using an FFT according to an example embodiment.

FIG. 3B is a diagram illustrating an example of a first haptic pattern data determiner separating an audio signal of a frequency band including desired bit pattern information using an FFT according to an example embodiment.

In an example embodiment, an audio signal 321 may be converted from a time domain into a frequency domain through an FFT. Through this, components of the audio signal may be separated based on a frequency band. Signals 323 may be separated audio signals corresponding to six different frequency bands f.sub.1, f.sub.2, f.sub.3, f.sub.4, f.sub.5, and f.sub.6. However, a scheme for separating a frequency band is not limited thereto. The first haptic pattern data determiner may select an audio signal 325 of the frequency band f.sub.2 including desired bit pattern information from audio signals separated into a plurality of frequency bands. The first haptic pattern data determiner may convert the selected audio signal 325 from the frequency domain into the time domain through an IFFT. The first haptic pattern data determiner may extract the desired bit pattern information by performing smoothing and half-wave rectification on an audio signal 427 converted into the time domain. The first haptic pattern data determiner may determine first haptic pattern data based on the extracted bit pattern information.

Figure 4A:
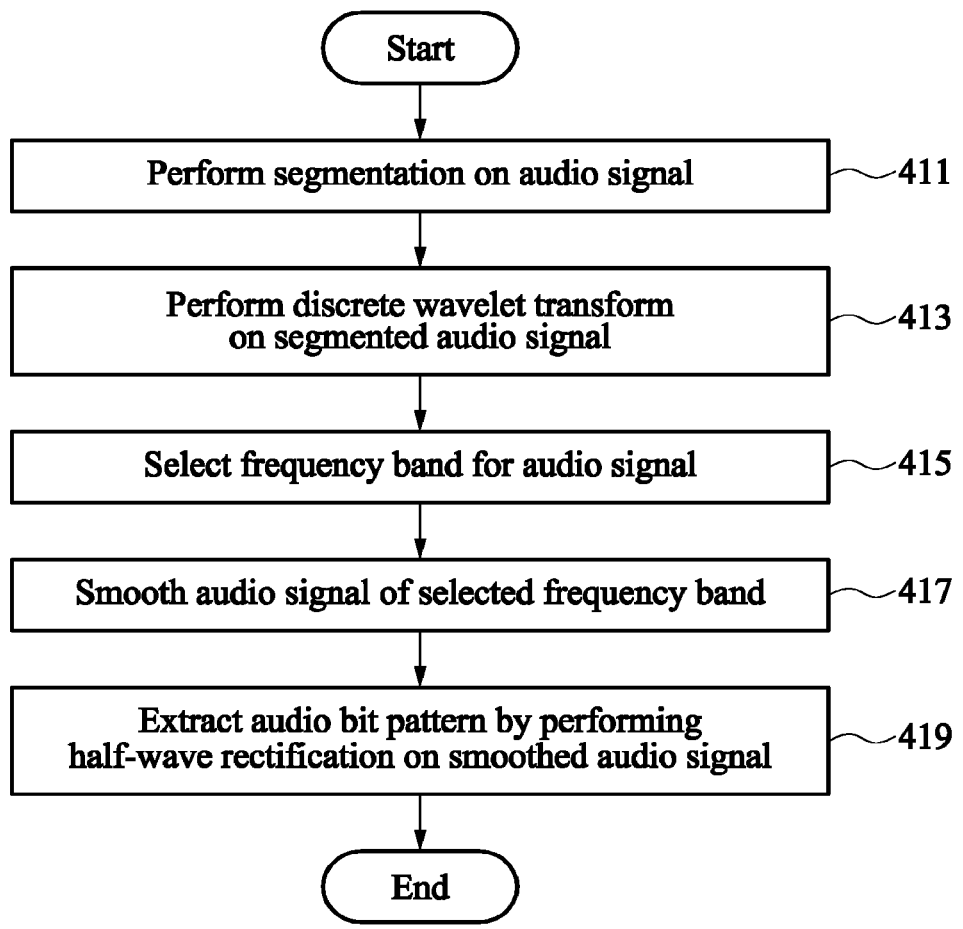
FIG. 4A is a flowchart illustrating a method of extracting, by a first haptic pattern data determiner, extracting audio bit pattern from an audio signal using a discrete wavelet transform (DWT) according to another example embodiment.

FIG. 4A is a flowchart illustrating a method of extracting, by a first haptic pattern data determiner, extracting audio bit pattern from an audio signal using a discrete wavelet transform (DWT) according to another example embodiment.

Referring to FIG. 4A, in operation 411, a first haptic pattern data determiner may perform segmentation on an input audio signal to perform a discrete wavelet transform on the input audio signal. For example, the first haptic pattern data determiner may segment an audio signal into 256 or 1024 data streams to smoothly perform the discrete wavelet transformation on the audio signal.

In operation 413, the first haptic pattern data determiner may separate the segmented audio signal for each frequency band through the discrete wavelet transformation. The first haptic pattern data determiner may separate the audio signal for each frequency band through the discrete wavelet transform to acquire an audio signal of a frequency band including a desired audio bit pattern. A method of separating an audio signal for each frequency band through the discrete wavelet transform will be described in detail with reference to FIG. 4B.

In operation 415, the first haptic pattern data determiner may select a signal of at least one frequency band including desired bit pattern information from audio signals separated based on a frequency band. For example, the first haptic pattern data determiner may select an audio signal of at least one frequency band including bit pattern information to be extracted such as bit pattern information associated with a noise-free audio signal, bit pattern information associated with a specific musical instrument of an audio signal, and the like.

In operation 417, the first haptic pattern data determiner may smooth the selected audio signal of the at least one frequency band. For example, in a process of smoothing the audio signal, the first haptic pattern data determiner may perform full-wave rectification on the selected audio signal, reduce a distortion occurring in the audio signal, and perform a convolution operation on the audio signal using a window function to smoothly correct a radically changing area. The window function may be, for example, a Hanning function, a Hamming function, and a Kaiser function, but is not limited thereto.

In operation 419, the first haptic pattern data determiner may extract an audio bit pattern by performing half-wave rectification on the smoothed audio signal. The first haptic pattern data determiner may determine haptic pattern data based on the extracted audio bit pattern.

Figure 4B:
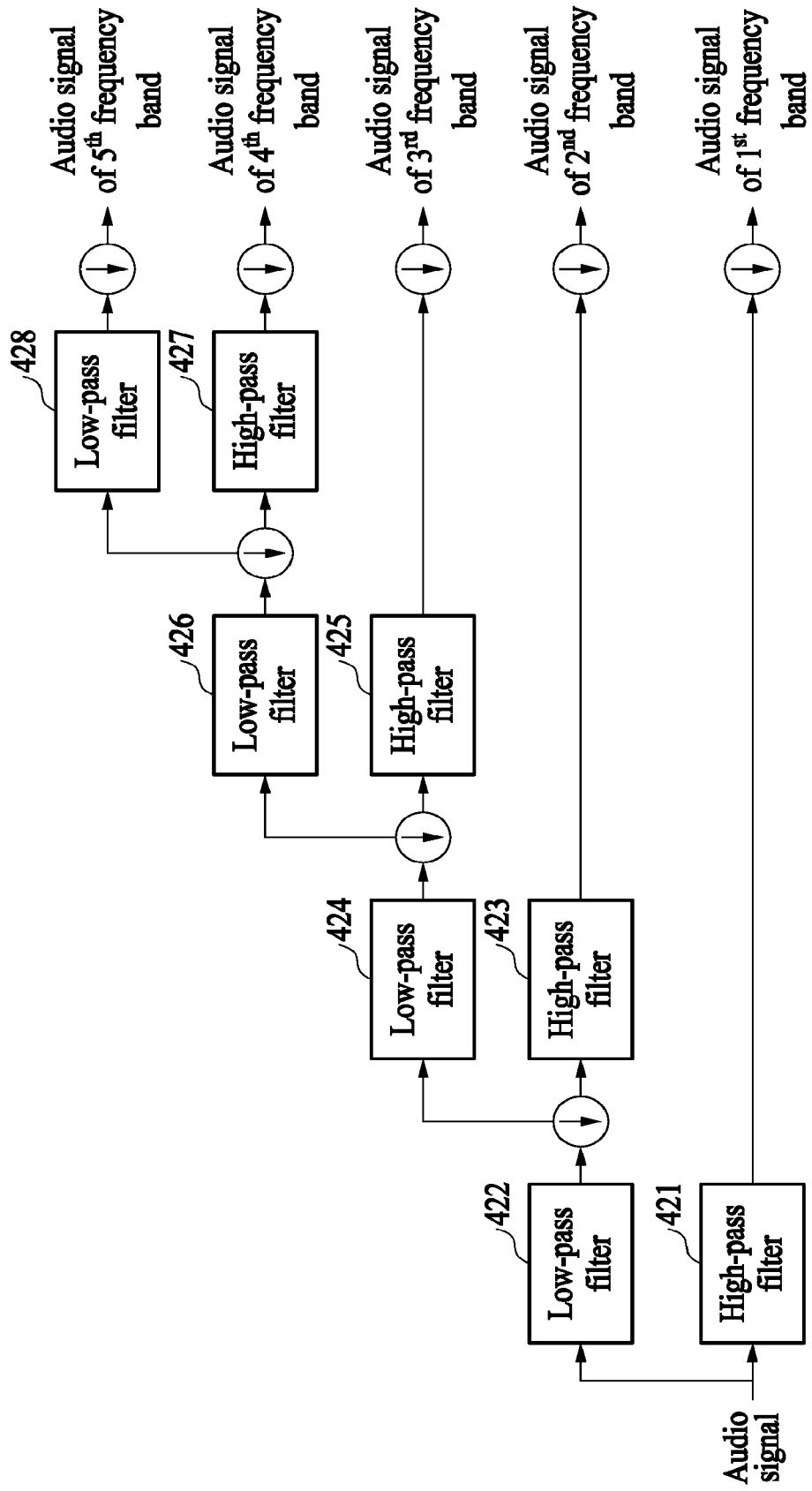
FIG. 4B is a diagram illustrating a process of dividing, by a first haptic pattern data determiner, an audio signal based on a frequency band through a DWT according to another example embodiment.

FIG. 4B is a diagram illustrating a process of dividing, by a first haptic pattern data determiner, an audio signal based on a frequency band through a DWT according to another example embodiment.

In an example embodiment, an input audio signal may be filtered by a high-pass filter 421. The audio signal filtered by the high-pass filter 421 may be down-sampled and separated as a first band frequency signal. An audio signal filtered by a low-pass filter 422 may be down-sampled to be used as an input audio signal for separating a second band frequency signal. The input audio signal for separating the second band frequency signal may be filtered by a high-pass filter 423, and down-sampled to be separated as the second band frequency signal. An audio signal filtered by a low-pass filter 424 may be down-sampled to be used as an input audio signal for separating a third band frequency signal. In response to such filtering and down-sampling processes being performed by filters 425, 426, 427, and 428, the first haptic pattern data determiner may divide an audio signal for each frequency band in a time domain. For example, when an audio signal is to be divided into signals of n frequency bands, a filtering process may be performed 2n times. The first haptic pattern data determiner may select an audio signal of at least one frequency band including desired bit pattern information from a plurality of frequency band signals, and extract an audio bit pattern by performing the half-wave rectification on the selected audio signal.

Figure 5:
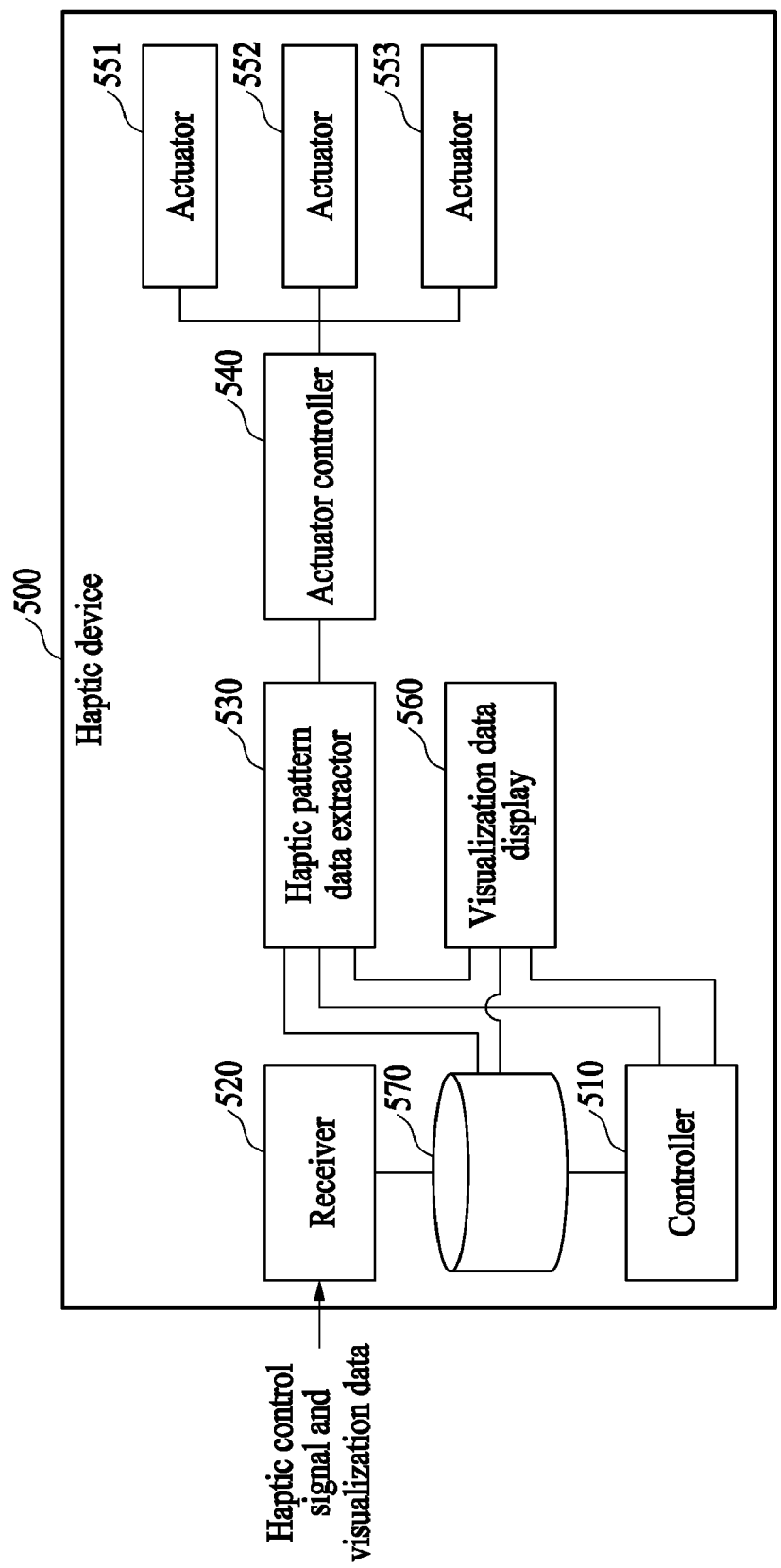
FIG. 5 is a diagram illustrating a configuration of a haptic device according to an example embodiment.

FIG. 5 is a diagram illustrating a configuration of a haptic device according to an example embodiment.

Referring to FIG. 5, a haptic device 500 may include a controller 510 that controls an operation of the haptic device, a receiver 520 that receives a haptic control signal and visualization data from a haptic control signal providing apparatus, a haptic pattern data extractor 530 that extracts haptic pattern data from the haptic control signal, an actuator controller 540 that generates an actuator control signal for controlling an operation of an actuator, actuators 551, 552, and 553 that generate vibration corresponding to a haptic stimulus provided by the haptic device, and a visualization data display 560 that displays received visualization data.

The controller 510 may control operations of the haptic pattern data extractor 530, the visualization data display 560, and a database 570. The receiver 520 may receive a haptic control signal and visualization data corresponding to haptic pattern data from a control signal providing apparatus through wired or wireless communication (including, for example, Ethernet, Bluetooth, ZigBee, Wi-Fi, and LTE), and store the received haptic control signal and visualization data in the database 570.

The haptic pattern data extractor 530 may extract haptic control data from the haptic control signal. The haptic pattern data extractor 530 may restore, from the haptic control signal, a data header, amplitude data, vibrating direction data, and signal state data of the haptic pattern data and extract haptic pattern data based on a restoration result. The extracted haptic pattern data may be transmitted to the actuator controller through a communication module (not shown)

The actuator controller 540 may generate an actuator control signal for controlling operations of the actuators 551, 552, and 553 based on the haptic pattern data. An operation of the actuator controller will be described in detail with reference to FIG. 6.

The actuators 551, 552, and 553 may generate a vibration based on the actuator control signal received from the actuator controller 540. For example, the actuators 551, 552, and 553 may generate a vibration corresponding to the haptic pattern data based on an actuator control signal in a form of current generated based on the haptic pattern data. Also, the actuators 551, 552, and 553 may be embodied in various forms based on provided content. For example, in a case of a haptic device provided in a shooting game, the actuators 551, 552, and 553 may be arranged on a vest worn by a user to generate a vibration such that the user experiences a gun-shot effect. In this case, the actuators 551, 552, and 553 may also be arranged in a shooting device to generate a vibration such that the user experiences a shooting effect. A number of the actuators 551, 552, and 553 is not limited to the example as shown in the drawing.

The visualization data display 560 may display characteristic information (for example, amplitude information, vibrating direction information, etc.) of the haptic pattern data based on the received visualization data. The visualization data may be, for example, information on an emoticon to be added to a screen and information on a character for displaying information on the haptic pattern data. The database 570 may store information on the haptic control signal, information on the visualization data, information on the haptic pattern data, and the like, for example.

Figure 6:
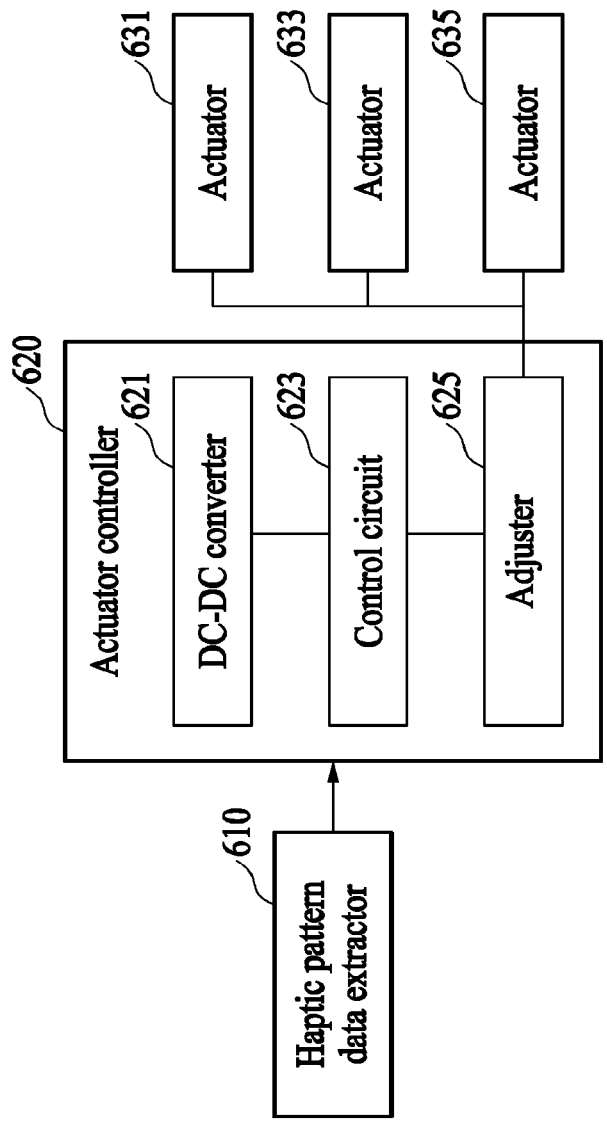
FIG. 6 is a diagram illustrating a configuration of an actuator controller according to an example embodiment.

FIG. 6 is a diagram illustrating a configuration of an actuator controller according to an example embodiment.

Referring to FIG. 6, an actuator controller 620 may include a control circuit 623 that generates a current based on haptic pattern data, a direct current (DC) to DC (DC-DC) converter 621 that converts a voltage of DC power applied to the actuator controller 620, and an adjuster 625 that adjusts a value of the current generated in the control circuit 623. The current generated in the control circuit 623 or the current having the value adjusted in the adjuster 625 may correspond to an actuator control signal.

The control circuit 623 may generate a current based on DC power applied from the DC-DC converter 621 and haptic pattern data received from a haptic pattern data extractor 610, and transmit the generated current to the adjuster 625. For example, the control circuit 623 may generate a current changing based on haptic pattern data through an H-bridge circuit. The DC-DC converter 621 may adjust a voltage of the DC power applied to the control circuit 623.

The adjuster 625 may adjust an intensity of the current generated by the control circuit 623 using a switch, apply the adjusted current to actuators 631, 633, and 635, and adjust vibrations of the actuators 631, 633, and 635. For example, the adjuster 625 may include a switching circuit. The adjuster 625 may use a switch of the switching circuit to adjust ratios between primary and secondary windings of coils connected to the actuators 631, 633, and 635 and adjust the current flowing in the actuators 631, 633, and 635 based on ratios between primary and secondary windings of coils of selected coils. The adjuster 625 may adjust a vibrating force of the actuators 631, 633, and 635 based on the adjusted current, so that the haptic device provides various haptic stimuli to a user based on the adjusted vibrations of the actuators 631, 633, and 635. In another example embodiment, the adjuster 625 may adjust a magnitude of voltage applied to the actuators 631, 633, and 635 through a variable resistor and adjust the intensity of current flowing in the actuators 631, 633, and 635 based on the adjusted magnitude of voltage.

Figure 7A:
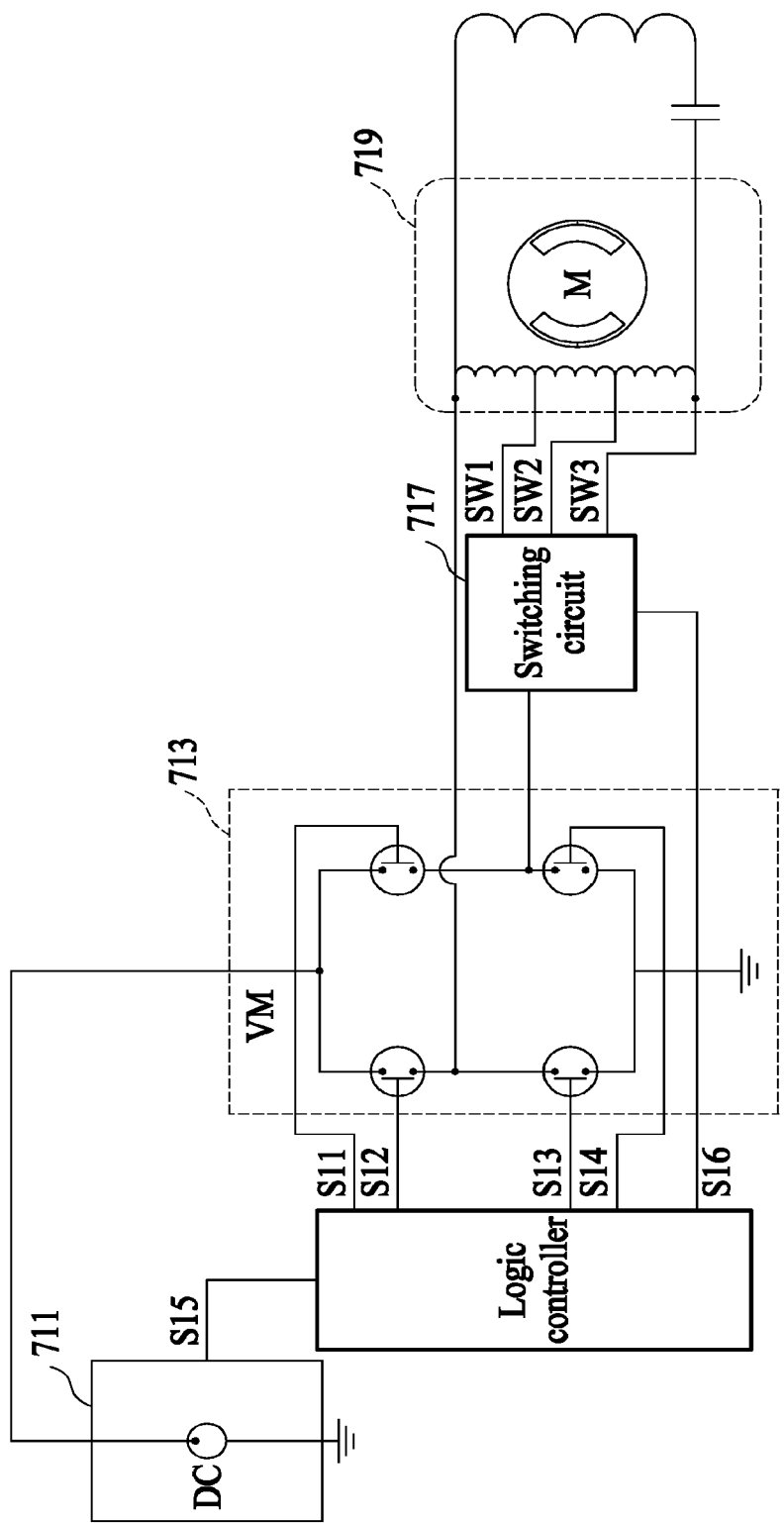
FIG. 7A is a diagram illustrating an example of a circuit of an actuator controller according to an example embodiment.

FIG. 7A is a diagram illustrating an example of a circuit of an actuator controller according to an example embodiment.

Referring to FIG. 7A, a control circuit 713 may include an H-bridge circuit including four metal-oxide semiconductor field-effect transistors (MOSFETs) or transistors. DC voltage of which a voltage is adjusted by a DC-DC converter 711 may be applied to the control circuit 713. The control circuit 713 may generate a current changing based on haptic pattern data and the voltage applied from the DC-DC converter 711. The current generated by the control circuit 713 may be adjusted through a switching circuit 717. The switching circuit 717 may adjust a ratio between primary and secondary windings of a coil connected to the switching circuit 717 through switching and adjust a current to be applied to an actuator 719 based on the adjusted ratio between primary and secondary windings of the coil. Such scheme may easily and quickly change and control three levels of voltage through a simple switching circuit, and may not require a complex pulse width modulation (PWM) signal intensity change or a PWM signal control time which is required in a typical method of controlling a PWM signal for voltage change. A vibration intensity and a moving direction of a vibrator of the actuator 719 may be adjusted based on the adjusted current. Also, a haptic stimulus may be generated based on the adjusted vibration of the actuator 719.

Figure 7B:
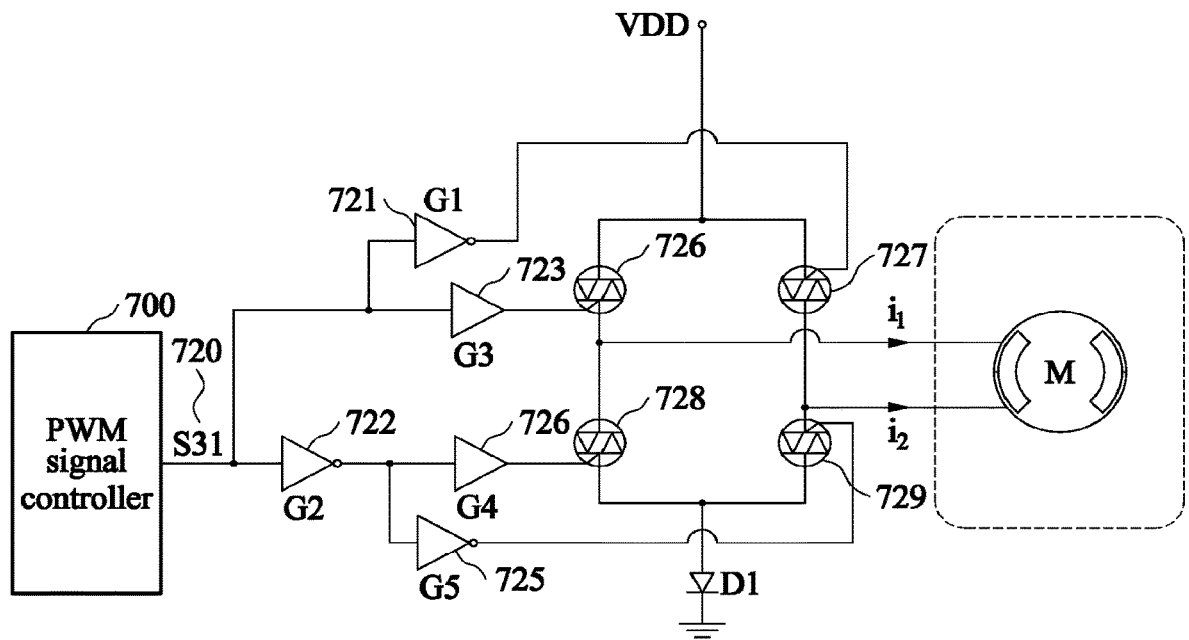
FIG. 7B illustrates a circuit diagram of a control circuit operating based on a single control signal according to another example embodiment.

FIG. 7B illustrates a circuit diagram of a control circuit operating based on a single control signal according to another example embodiment.

A circuit of FIG. 7B may be a circuit in which a DC-DC converter and a typical H-bridge circuit are connected with a logic circuit including a buffer and a NOT gate. Through a control circuit connected to the logic circuit including the buffer and the NOT gate, an actuator control may be performed based on a single control signal S31 720. Specifically, a DC voltage level required to drive a motor may be provided to a circuit by the DC-DC converter. The provided DC voltage level may be controlled by a PWM signal controller 700 based on information on a vibration intensity change included in haptic pattern data.

When the control signal S31 720 is in a High state, a Low-state signal may be output to a gate G1 721. In this case, a transistor 727 connected to the gate G1 721 may be an On state so that a current flows therein. In addition, a High-state signal equal to a control signal 720 may be output to a gate G3 723. Also, a transistor 720 connected to the gate G3 723 may be in an Off state, so that a current does not flow therein. When the control signal S31 720 is in a Low state, an output of a gate G2 722 may be a High-state signal. Also, the High-state signal may be output to a gate G4 724 on connection, so that a transistor 728 on connection may be in the Off state. An output of a gate G5 725 connected to an output of the gate G2 722 may be a Low-state signal. Also, a transistor 729 connected to the gate G5 725 may be in the On state, so that a current flows therein. In other words, when the control signal S31 720 is in the High state, the transistor 727 and the transistor 728 may be in the On state, so that the current flows in a forward direction i2. Also, when the control signal S31 720 is in the Low state, the transistor 726 and the transistor 729 may be in the On state, so that the current flows in a reversed direction i1. In the above-described method, a direction in which the current flows in the actuator may be determined based on the single control signal 720. In this example, an intensity of voltage applied to the actuator may also be adjusted based on a change in intensity of the control signal S31 720 of the PWM signal controller 700. When a plurality of control signals is used, synchronization of the control signals may be required to control an operation of a single actuator. When the plurality of control signals is not synchronized, it is difficult to generate a desired vibration pattern using an unsynchronized control signal. The above-described method has an advantage of easily generating a vibration pattern since a synchronization process can be omitted by using the single control signal 720.

Figure 7C:
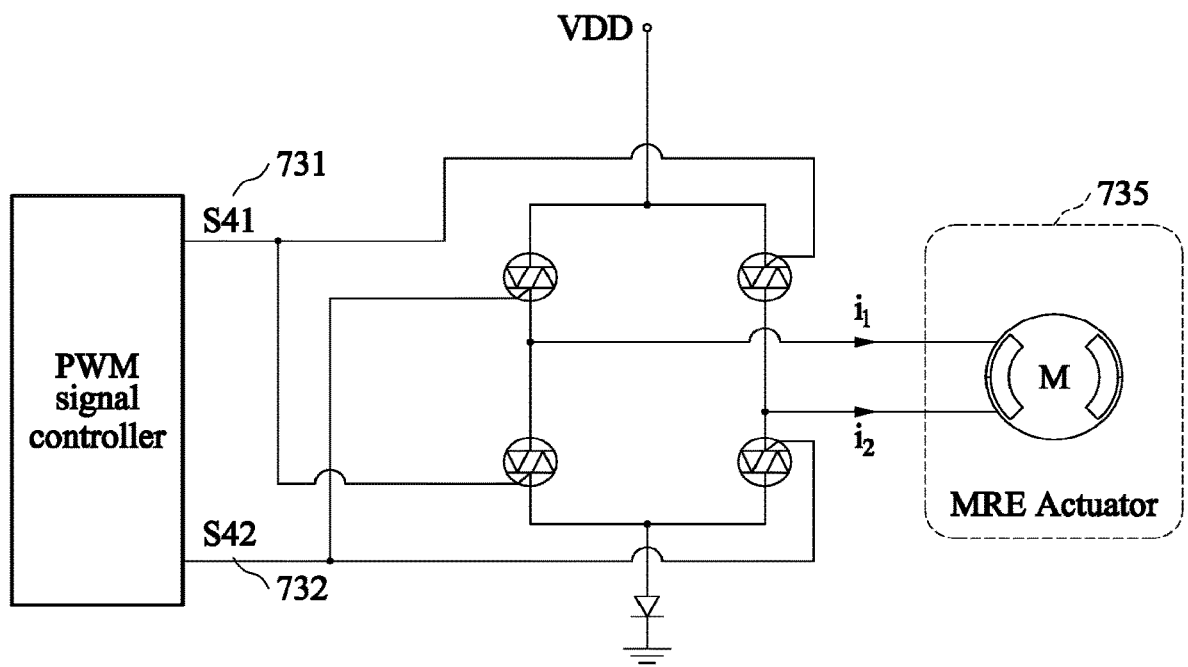
FIG. 7C illustrates an example of a circuit to generate various patterns of control signals according to another example embodiment.

FIG. 7C illustrates an example of a circuit to generate various patterns of control signals according to another example embodiment.

Referring to FIG. 7C, a DC voltage level required for driving a motor may be provided to a circuit of FIG. 7C through a DC-DC converter. The provided voltage level may be controlled by a PWM signal controller based on information on a vibration intensity change included in haptic pattern data. An actuator 735 may be controlled based on a control signal S41 731 and a control signal S42 732. When the control signal S41 731 is in a Low state and the control signal S42 732 is in a High state, a current may flow in a forward direction i2. In contrast, when the control signal S41 731 is in the High state and the control signal S42 732 is in the Low state, the current may flow in a reversed direction i1. In addition, an intensity of voltage applied to the actuator 735 may be adjusted based on changes in intensity of the control signals 731 and 732. Also, the actuator may be controlled based on the control signals 731 and 732 in various types such as a sine wave, a half sine wave, a square wave, a half square wave, and the like, for example.

Figure 7D:
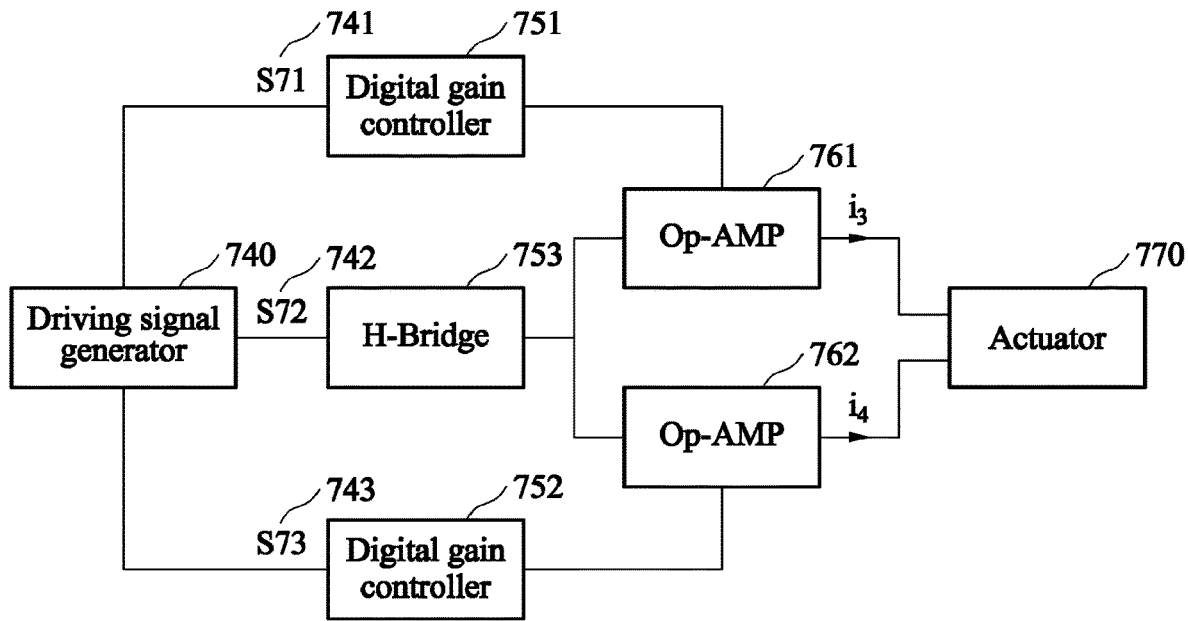
FIG. 7D illustrates an example of a circuit for a haptic device generating various haptic stimuli.

FIG. 7D illustrates an example of a circuit for a haptic device generating various haptic stimuli.

An actuating driver used for a linear resonant actuator (LRA) may be a haptic driver integrated circuit, which generates a sine wave having a constant amplitude and change only a frequency and an operational time of the generated sine wave. A haptic device of FIG. 7D may generate a sine wave, a triangular wave, a square wave, and the like through a driving signal generator 740, digital gain controllers 751 and 752 including digital gain resistors, and OP AMPs 761 and 762. The haptic device may change an operational time, a frequency, and an amplitude of each of the generated wave, thereby generating various haptic stimuli.

Specifically, the operational time may be set in response to a digital output S72 742 being output from the driving signal generator 740 in a High state, and an idle time may be set in response to the digital output S72 742 being output in a Low state. Also, current directions i3 and i4 may be determined in response to a signal associated with a phase change being provided to an H-Bridge 753 through the driving signal generator 740, so that a moving direction of an actuator 770 may be determined based on the determined current directions. Also, the driving signal generator 740 may adjust an intensity of voltage provided to the actuator 770 through the digital gain controllers 751 and 752. In this case, an intensity of current flowing in the actuator 770 may be controlled based on the adjusted intensity of voltage whereby a driving intensity of the actuator 770 is determined. According to an example embodiment of generating various intensities of driving signal in a form of square wave based on the above-described method, the driving signal generator 740 may generate a square-wave pattern signal as the digital output S72 742, so that a driving direction of the actuator 770 based on a current direction determined through the H-Bridge 753. The driving signal generator 740 may determine the driving intensity of the actuator using the digital gain controllers 751 and 752, thereby generating a square-wave driving signal. According to another example embodiment of generating a sine-wave driving signal, a total length of time in which a sine wave is output to the digital output S72 742 through the driving signal generator 740 may be determined. In this example, in the driving signal generator 740, gains of the digital gain controllers 751 and 753 may be adjusted based on a signal S71 741 and a signal S73 743. Through this, a form of an output signal may be adjusted based on a magnitude change of the output signal such that output signals of the OP-AMPs 761 and 762 are in a form of half sine wave. Also, the output signals adjusted to the half sine wave may be re-output in a current direction changed through the H-Bridge 753, so that a driving signal in a fully sine-wave form is generated. The actuator 770 may be driven based on the generated sine-wave driving signal. By controlling an amplitude and a phase of a driving signal in a manner similar to the scheme of generating the sine-wave driving signal, a half sine eave, a square wave, a half square wave, a triangular wave, and the like may be generated. A form of a generated driving signal is not limited to the foregoing examples. Through an adjustment of an amplitude and a phase, any form of driving signal may be generated. The driving signal may correspond to an actuator control signal.

Figure 8:
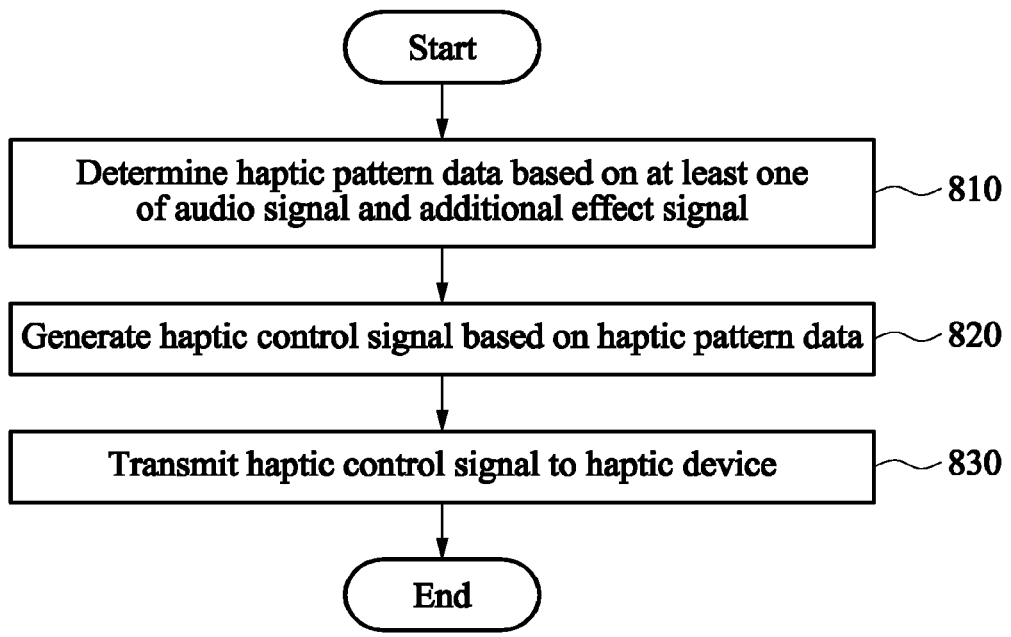
FIG. 8 is a flowchart illustrating an operation of a haptic control signal providing method performed by a haptic control signal providing apparatus according to an example embodiment.

FIG. 8 is a flowchart illustrating an operation of a haptic control signal providing method performed by a haptic control signal providing apparatus according to an example embodiment.

Referring to FIG. 8, in operation 810, a haptic control signal providing apparatus may determine haptic pattern data based on at least one of an audio signal and an additional effect signal. The haptic control signal providing apparatus may extract an audio bit pattern from the audio signal and determine the haptic pattern data based on the extracted audio bit pattern. For example, the haptic control signal providing apparatus may divide a frequency band of an audio signal through an FFT or wavelet transform, select a signal of a frequency band including desired bit pattern information, extract an audio bit pattern from the selected signal, and determine haptic pattern data based on the extracted audio bit pattern. The haptic control signal providing apparatus may extract haptic pattern data corresponding to an additional effect and stored in a database in advance, and determine haptic pattern data based on the extracted haptic pattern data.

In operation 820, the haptic control signal providing apparatus may generate a haptic control signal based on the haptic pattern data. For example, the haptic control signal providing apparatus may determine at least one of a signal amplitude characteristic, a signal direction characteristic, and a signal state characteristic of the haptic control signal based on the haptic pattern data.

In operation 830, the haptic control signal providing apparatus may transmit the haptic control signal to a haptic device. The haptic control signal providing apparatus may transmit the haptic control signal to the haptic device through wired or wireless communication including, for example, Ethernet, Bluetooth, ZigBee, Wi-Fi, and LTE.

Figure 9:
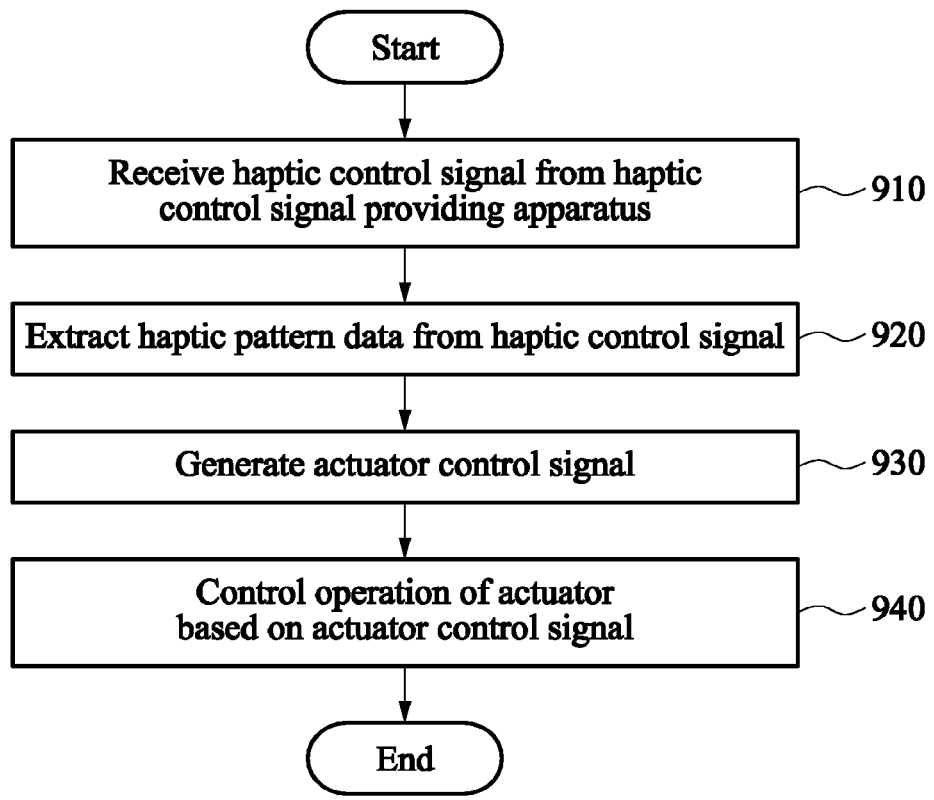
FIG. 9 is a flowchart illustrating an operation of an actuator control method performed in a haptic device according to an example embodiment.

FIG. 9 is a flowchart illustrating an operation of an actuator control method performed in a haptic device according to an example embodiment.

Referring to FIG. 9, in operation 910, a haptic device may receive a haptic control signal from a haptic control signal providing apparatus. In operation 920, the haptic device may extract haptic pattern data from the received haptic control signal. For example, the haptic device may restore the haptic pattern data based on at least one of a signal amplitude characteristic, a signal direction characteristic, and a signal state characteristic of the haptic control signal.

In operation 930, the haptic device may generate an actuator control signal based on the extracted haptic pattern data. For example, the haptic device may generate an actuator control signal in a form of current based on the haptic pattern data through an H-bridge circuit, and adjust the actuator control signal by adjusting a ratio between primary and secondary windings of a coil through a switching circuit. In operation 940, the haptic device may control an operation of an actuator based on the actuator control signal. For example, the actuator may generate a haptic stimulus by generating a vibration corresponding to the haptic pattern data based on the actuator control signal.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for providing a haptic control signal, the apparatus comprising:
   a haptic pattern data determiner configured to determine haptic pattern data based on an audio signal and a predetermined special effect signal;
   a haptic control signal generator configured to generate the haptic control signal for controlling a haptic operation of a haptic device based on the haptic pattern data; and
   a transmitter configured to transmit the haptic control signal to the haptic device,
   and the haptic control signal comprises:
   a data header including at least one of information on a format of the haptic control signal and information on a capacity of the haptic control signal;
   an amplitude data for determining a haptic intensity of the haptic device; and
   a signal state data including data for a time when the haptic operation of the haptic device maintains a maximum amplitude or data for a time when the haptic operation of the haptic device maintains an idle state.

2. The apparatus of claim 1, wherein the haptic pattern data determiner is configured to extract an audio bit pattern from the audio signal and determine the haptic pattern data based on the extracted audio bit pattern.

3. The apparatus of claim 2, wherein the haptic pattern data determiner is configured to divide the audio signal based on a frequency band, select a signal of at least one frequency band including desired bit pattern information from signals into which the audio signal is divided based on the frequency band, and extract the audio bit pattern by performing half-wave rectification on the selected signal of the at least one frequency band.

4. The apparatus of claim 1, wherein the haptic control signal generator is configured to determine at least one of a signal amplitude characteristic, a signal direction characteristic, and a signal state characteristic of the haptic control signal based on the haptic pattern data.

5. The apparatus of claim 1, further comprising: a visualization data generator configured to generate visualization data corresponding to the haptic pattern data, wherein the transmitter is configured to transmit the visualization data to the haptic device.

6. The apparatus of claim 1, wherein the haptic device is configured to receive the haptic control signal from the apparatus and generate an actuator control signal for controlling an operation of an actuator based on the received haptic control signal.

7. A haptic device comprising:
   a receiver configured to receive a haptic control signal from the haptic control signal providing apparatus of claim 1;
   a haptic pattern data extractor configured to extract the haptic pattern data from the received haptic control signal;
   an actuator configured to generate the haptic operation; and
   an actuator controller configured to generate an actuator control signal for controlling an operation of the actuator based on the extracted haptic pattern data.

8. The haptic device of claim 7, wherein the haptic pattern data extractor is configured to restore the haptic pattern data based on at least one of a signal amplitude characteristic, a signal direction characteristic, and a signal state characteristic of the haptic control signal.

9. The haptic device of claim 7, wherein the receiver is further configured to receive visualization data corresponding to the haptic pattern data from the haptic control signal providing apparatus, and the haptic device further comprises: a visualization data display configured to display characteristic information of the haptic pattern data based on the received visualization data.

10. The haptic device of claim 7, wherein the haptic pattern data is generated by the haptic control signal providing apparatus based on audio data and predetermined special effect data.

11. A haptic device comprising:
    an actuator controller configured to receive a haptic control signal from the haptic control signal providing apparatus of claim 1, to extract haptic pattern data from the received haptic control signal, and to generate an actuator control signal for controlling an operation of an actuator based on the haptic pattern data; and
    an actuator configured to generate a haptic stimulus based on the generated actuator control signal.

12. The haptic device of claim 11, wherein the actuator controller comprises: a direct current (DC) to DC (DC-DC) converter configured to apply DC power to a circuit; and a control circuit configured to generate an actuator control signal based on the haptic pattern data, wherein the actuator is configured to generate the haptic stimulus based on the control signal.

13. The haptic device of claim 12, wherein the control circuit is configured to generate the control signal based on a bridge circuit.

14. The haptic device of claim 12, wherein the actuator controller further comprises: an adjuster configured to adjust an intensity of the generated control signal.

15. The haptic device of claim 14, wherein the adjuster is configured to adjust the intensity of the control signal by adjusting a turns ratio of a coil connected to the actuator through a switch.

16. The haptic device of claim 14, wherein the adjuster is configured to adjust the intensity of the control signal through a variable resistor.

17. The haptic device of claim 14, wherein the actuator controller is configured to generate an actuator control signal that adjusts a form of the control signal by adjusting an amplitude and a phase of the control signal.

18. The haptic device of claim 1, wherein a predetermined special effect is stored in the database in advance, and the predetermined special effect includes at least one of a raining effect and a gunshot effect.

19. The haptic device of claim 1, wherein the haptic pattern data determiner is configured to extract the determined haptic pattern data from haptic pattern data stored in a database in advance.

* * * * *